Oct. 4, 1960 L. R. KALOUS 2,954,707
BIDIRECTIONAL SPRING-LOADED, CONTROL DEVICE
Filed Feb. 17, 1958 2 Sheets-Sheet 1

INVENTOR.
LEO R. KALOUS
BY Marvin Moody
ATTORNEY

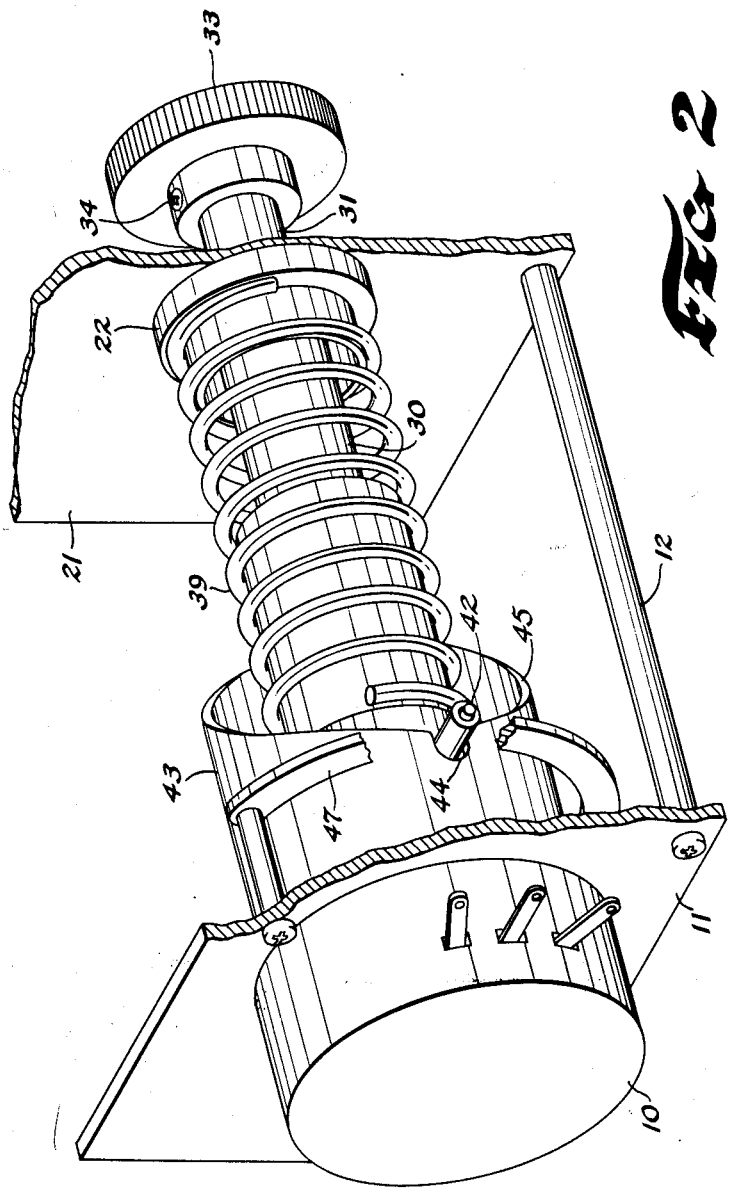

United States Patent Office 2,954,707
Patented Oct. 4, 1960

2,954,707
BIDIRECTIONAL SPRING-LOADED, CONTROL DEVICE

Leo R. Kalous, Cedar Rapids, Iowa, assignor to Collins Radio Company, Cedar Rapids, Iowa, a corporation of Iowa Filed Feb. 17, 1958, Ser. No. 715,696

6 Claims. (Cl. 74—504)

This invention relates in general to a shaft control device and more particularly to a spring-loaded control device for use with a plurality of electronic components.

In the electrical field, the need arises for a centered electronic component having spring return to the centered rest position. In many cases, the component controls a critical value in the apparatus, such as zero centering of the operating point. In prior coupler systems, a barrel cam having a V-shaped cam surface has been used to provide a return force towards the rest postition. The prior art devices have been undesirable for several reasons. First, the control knob rose as a function of rotation from the control panel. Second, there was no detent or lock against accidental or unintentional actuation of the device. Further, prior systems usually required separate, additional controls for energizing the system in which the centering electronic element was used.

It is an object of this invention to provide a spring-loaded controller for a pair of electronic devices such that one is energized immediately and that the other is energized in varying amounts from a rest position with a spring return to said rest position upon release of the control shaft.

It is a further object of this invention to provide a shaft controller having a bidirectional spring return centered about a locked rest position whereby accidental actuation is avoided.

It is a feature of this invention that three coaxial shafts are coupled together by a crosspin which engages a fixed barrel cam. Rotation of the three coupled shafts forces cam-determined compression of an axial spring while said crosspin maintains coupling of the three shafts. The spring force acting on the barrel cam creates a return force to a rest position. Neither control knob nor load shaft moves axially throughout rotation.

A further feature of the invention is that the return spring force also drives the crosspin into a locking notch in the barrel cam providing a rotational lock which requires a conscious motion on the part of the operator to unlock.

It is a further feature of this invention that the axial position of the crosspin in the locking notch is usable to actuate a switch for energizing the component driven by rotation of the control.

Further objects, features, and advantages of the invention will become apparent from the following description and claims when read in conjunction with the drawings in which:

Figure 2 shows an isometric view of the controller of Figure 1 with the top turned towards the viewer to illustrate more clearly the barrel cam and locking notch.

Figure 1:
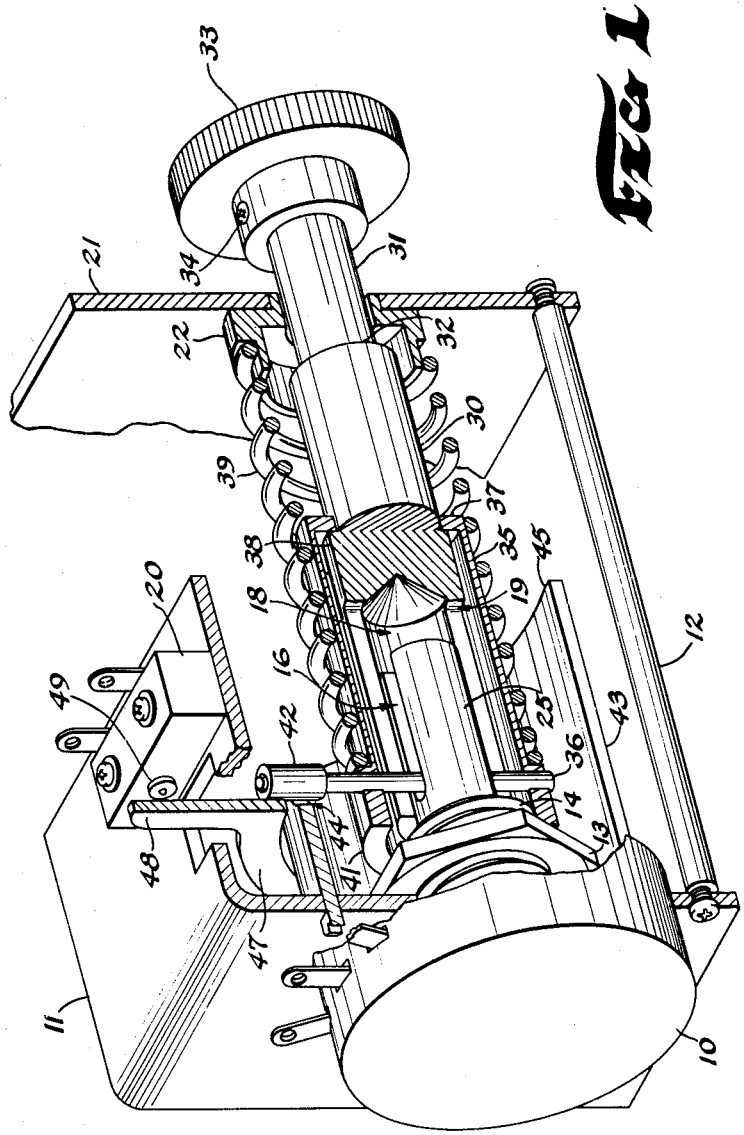
Figure 1 shows an isometric view of the controller in half section.

In bidirectional motor control systems, for example, the need arises for a mechanical shaft system for safely controlling a centering control potentiometer. In many motor control systems, once the entire system has been centered or zeroed by the use of the component coupled to this controller, further accidental rotation must be prevented. Further, the controller between the adjusting knob for the operator and the electronic component controlling the motor system must be convenient, logical to use and automatically returnable to the rest position upon its release. These requirements ensure the greatest utility with the greatest safety.

In the form of the invention illustrated, a potentiometer 10 and a switch 20 are provided with a predetermined mechanical control characteristic by the shaft control of the invention. Potentiometer 10 is connected into the command circuit of the motor control system mentioned above such that movement of the tap in either direction from a central rest position will command the motor to run in one direction or the other. The extent of motion from the rest position determines the speed or type of response of the system to the command. Switch 20 is connected into the system so as to energize the potentiometer or may provide some other desirable function, such as a zero balance indicating light, or indicator warning when the system is being adjusted by this control. Switch 20, as shown, is actuated upon the unlocking of the controller and remains actuated for all other positions of rotation of the potentiometer 10. Switch 20 is deactuated upon the locking of the system.

The controller comprises, in somewhat idealized terminology, three shafts, a load shaft 25, a hollow control or driving shaft 30 and a sleeve 35. These three shafts are mutually coupled together for rotation but have considerable tolerance for axial motion of one with respect to the other. Further, the three shafts are coaxially and concentrically mounted one within the other. Only the load shaft is fixed against any axial motion, the sleeve being substantially free, with the control shaft free enough to permit unlocking of the crosspin.

While it is to be recognized that the frame may consist of any particular arrangement convenient to the purpose at hand, the frame illustrated includes a front panel 21 which mounts a front control shaft bearing 22. The front panel portion of the control shaft 30 is supported for both rotation and axial motion by bearing 22. The control shaft has a journal 31 which runs in bushing 22. A shoulder 32 cooperates with bearing 22 to prevent excessive axial motion. This stop shoulder 32 prevents the operator from pulling shaft 30 out away from the panel any further than necessary to free the detented crosspin for possible rotation. A knob 33, providing gripping surfaces for rotation and for axial motion, is mounted on an extension of the journalled portion 31 on the outside of the panel 21. A set screw 34 or other means is used to fasten the knob to the control shaft.

A further portion of the frame for holding the controller, and the components controlled, is an L-shaped member 11. This member is held a fixed distance from the front panel 21 by a number of stand-off posts 12. These are shown in the interest of clarity in positions which may not be desirable from an engineering standpoint. The assembly of the front panel 21, the stand-off posts 12 and the L-shaped frame 11 thus provide a rigid frame for mounting the controller and its loads.

Potentiometer 10 is mounted through a hole in and secured to frame 11 by a nut 13 running on the hollow, threaded mounting stud 14. Extending out through the mounting stud 14 from the inside of the potentiometer 10 is the load shaft 25. The mounting hole for the potentiometer has been positioned such that the load shaft 25 is coaxial to the control shaft 30 and concentrically meshed therewith.

The shaft of the potentiometer is slotted at slot 16, providing an axial smooth-walled slot. Slot 16 is centered on the axis of rotation of the load shaft 25.

Control shaft 30 is relieved by a hole 18 to accept substantially all of the load shaft and obtain support of that end of shaft 30. The end of shaft 30, thus concentric to the load shaft, is similarly slotted at 19. This slot is also centered on the axis of rotation of shaft 30 and is smooth-walled with approximately the same width as slot 16.

Concentric to shaft 30, the third shaft, a sleeve 35, is coupled for rotation to both the load and control shafts by means of a crosspin 36. Crosspin 36 is fixed to sleeve 35 and is just slightly smaller than the slots 16 and 19.

Sleeve 35, although coupled to both shafts by crosspin 36, is free to move axially of both shafts by virtue of the lengths of the slots 16 and 19. The axial motion of the sleeve 35 is controlled by two factors; first, in the left-hand direction by a flange 37 turned inwardly towards control shaft 30 to cooperate with a shoulder 38 on control shaft 30. The right-hand motion is elastically limited by spring 39. Spring 39 bears on a shoulder of bearing 22, although it may bear against front panel 21, while the opposite end of spring 39 bears against a shoulder 41 on sleeve 35. It is to be noted that spring 39 forces sleeve 35 against shoulder 38 and thereafter the assembly of sleeve 35 and shaft 30 towards the load shaft 25.

One end of crosspin 36 is provided with a roller 42. This roller projects outwardly from sleeve 35. A barrel cam 43 in the form of a variable length cylinder is mounted on frame 11 concentrically with the three shafts with substantially a constant radius relative to the axis of rotation of the three shafts. Barrel cam 43 has a notch 44 at a desired rest position. For the centering control in an electrical circuit, the notch 44 is placed centrally of the range of the cam 43. As better seen in Figure 2, cam 43 has a rising characteristic of its cam edge 45 for rotation in either direction, of the three shafts, from the rest position. This is to say that rotation of the three shafts by the control knob 33 from the rest position causes roller 42 to run up onto the cam surface 45 forcing the roller towards the front panel. For a uniform bidirectional centering system, cam surface 45 will have a simple V characteristic, when considered developed or in flat form. Other shapes dictated by the characteristics of the machinery or circuits controlled may be used in forming cam 43. Cam surface 45 has the desired shape radially if formed from sheet metal having a square edge, as well as the V profile characteristic.

Spring 39 has an inside radius to provide clearance for axial motion on sleeve 35 as dictated by the motion of the cam follower roller 42 on cam 43. Further, spring 39 has such a characteristic spring constant as to obtain the required return force resulting from the tendency of roller 42 to roll down the incline of cam 43 toward the rest position.

A yoke 47 is placed so as to be adjacent notch 44. A tail 48 extends upwardly towards switch 20 so as to bear on the switch actuator pin 49. The yoke is springy and mounted on the frame 11. When roller 42 falls into notch 44 it bears against yoke 47 also. In this position, tail 48 is pushed away from pin 49. Tail 48 is adjusted so that upon withdrawal of roller 42 from notch 44, the tail contacts pin 49. Due to the springiness of yoke 47, this actuates switch 20. The timing of this actuation relative to the degree of withdrawal of roller 42 from the notch 44 can be controlled if desired.

Figure 2 shows a top view of Figure 1 with portions of the mechanism removed to better illustrate the shape of the cam surface 45 and notch 44. Unnecessary details have been removed to avoid confusion.

In operation, the shaft controller serves to rotate the load shaft with certain knob characteristics. Spring 39 forces sleeve 35 against cam surface 45 to such a degree that a restraining force to the center or to the rest position marked by notch 44 occurs. This camming action returns all three shafts to their rest position. As the roller centers in the V of the cam 45 under the force of spring 39, roller 42 drops into notch 44 and is held there by the remaining force of spring 39. This is the status of the control as pictured. Flange 37 rests on adjacent shoulder 38. Knob 33 is in its most compact position adjacent to panel 21, and load shaft 25 is centered.

Roller 42 is held in notch 44 by the force of spring 39 so that a person accidentally leaning or brushing against knob 33 cannot turn the control mechanism. Also, roller 42 bears against yoke 47 deactuating switch 20 as a consequence of tail 48 being pushed away from actuating pin 49.

To use the centering control, knob 33 is grasped and pulled away from panel 21. This pulls roller 42 out of notch 44, unlocking the rotational lock provided by notch 44. At the same time, yoke 47 is released so as to drive tail 48 against pin 49 to actuate switch 20. The timing of switch 20 being actuated relative to the position of roller 42 either in the notch or adjacent may be controlled readily by the bias of tail 48.

The outward pull of control shaft 30 by knob 33 is coupled to sleeve 35 by the flange 37 and shoulder 38. Once roller 42 clears the restraining confines of notch 44, knob 33 is rotated as desired. This rotation is coupled to sleeve 35 and load shaft 25 by crosspin 36. As rotation of the three shafts is accomplished, cam follower 42 rides up on cam surface 45, compressing spring 39. Flange 37 leaves shoulder 38 as the axially cam-driven sleeve 35 moves toward the front panel. Crosspin 36 slides in the slots 16 and 19, providing rotational coupling, but allowing sleeve 35 to absorb the axial motion resulting from rotation. Although the operator can push knob 33 in or out slightly, any further push or pull beyond that needed to pull the system out of its locking notch does not occur. Instead, further rotation for further actuation of load shaft 25 is possible, compressing spring 39 further due to the continued rise of cam surface 45. Because of the V shape of the cam, the compression of spring 39 creates a return torque on the three shafts, this return torque always being towards the rest, or locking position. A further feature can be seen in the continuing compression spring 39 in that a sense of magnitude is given the operator through his feel of the knob, so that gauge of the correction introduced in the electrical system can be made.

Once the desired result has been achieved electrically, release of knob 33 permits the restraining force of spring 39 to drive the three shafts quickly back to the rest position. Once centered, roller 42 is further urged into locking slot 44 bringing the system to a rest. As roller 42 approaches the final locked position, yoke 47 is contacted urging tail 48 away from pin 49, deactuating switch 20.

Although this invention has been described with respect to a particular embodiment thereof, it is not to be so limited because changes and modifications may be made therein which are within the full intended scope of the invention as defined by the appended claims.

I claim:

1. A spring return controller comprising a frame, a slotted load shaft rotatably mounted on said frame, a hollow slotted control shaft mounted on said frame, said control shaft concentrically receivable within said load shaft, a sleeve, said sleeve being concentric with said load and control shafts, a crosspin mounted on said sleeve, said crosspin transversing the slots of said load and control shafts, spring means, said spring means being mounted between said sleeve and said frame to bias the sleeve in one direction, cam means with a first cam surface attached to the frame and in engagement with said crosspin, said cam formed to move said crosspin in a second direction away from a rest position.

2. A spring controller as claimed in claim 1 wherein the rest position is centrally located of a range of rotation, wherein said cam means is symmetrical about said rest position, loading said spring means for either direction of rotation, said cam means having a notch at said rest position preventing a rotation of said crosspin, and coupling means between said control shaft and said sleeve whereby a longitudinal motion of said control shaft is required to unnotch said crosspin for rotation of said shafts.

3. The controller of claim 2 wherein means for sensing said pin is positioned adjacent said notch, whereby the locking of said shafts by said crosspin resting in said notch is sensed.

4. A spring return controller comprising a frame, a control shaft supported by the frame, a load shaft, said shafts being coupled together, a sleeve, said sleeve being rotatably coupled to said control shaft with axial freedom of motion, a crosspin attached to the sleeve and extending through slots formed in the control and load shafts, spring means mounted between said frame and said sleeve for urging said sleeve against said crosspin, a fixed cam surface mounted between said frame and said sleeve the crosspin in engagement with the cam, the cam formed with a home position to return said shaft to a rest position.

5. A spring return shaft controller comprising a slotted load shaft, a slotted control shaft, said control shaft having a shoulder, a sleeve having axial spring loading, said spring loading urging said sleeve against said shoulder, a barrel cam with a fixed cam surface, said load shaft, control shaft, sleeve, and barrel cam being concentrically mounted, a crosspin fixed in said sleeve, said crosspin being in the slots of both of said shafts, said crosspin in engagement with the fixed cam surface, said fixed cam surface shaped so that rotation of said control shaft from a rest-position increases said spring loading to provide a return to rest position force.

6. The controller of claim 5 wherein said rest position on said fixed cam surface is a notch which requires axial motion of said pin prior to rotation, and said shoulder couples said control shaft to said sleeve for transmitting such axial motion, whereby said controller in said rest position is locked against undesired rotation.

References Cited in the file of this patent

UNITED STATES PATENTS

| | | |
|---|---|---|
| 755,852 | Dennison | Mar. 29, 1904 |
| 1,490,656 | Bignam | Apr. 15, 1924 |
| 1,522,491 | Boswell | Jan. 13, 1925 |
| 2,341,647 | Parkhurst | Feb. 15, 1944 |
| 2,665,904 | Lehmann | Jan. 12, 1954 |
| 2,732,244 | Gaines | Jan. 24, 1956 |
| 2,800,806 | Sangster | July 30, 1957 |
| 2,811,867 | Hogberg | Nov. 5, 1957 |
| 2,839,945 | Zion | June 24, 1958 |
| 2,861,470 | Baker | Nov. 25, 1958 |

FOREIGN PATENTS

| | | |
|---|---|---|
| 24,718 | France | June 13, 1922 |
| | (Addition to No. 519,190) | |